4 Sheets—Sheet 1.

FROST & MONROE.

Separating Flour from Bran.

No. 302. Reissued March 13, 1855.

N. PETERS, Photo-Lithographer, Washington, D. C.

4 Sheets—Sheet 2.

FROST & MONROE.

Separating Flour from Bran.

No. 302. Reissued March 13, 1855.

N. PETERS, Photo-Lithographer, Washington, D. C.

4 Sheets—Sheet 3.
FROST & MONROE.
Separating Flour from Bran.
No. 302.
Reissued March 13, 1855.
Fig. 4,
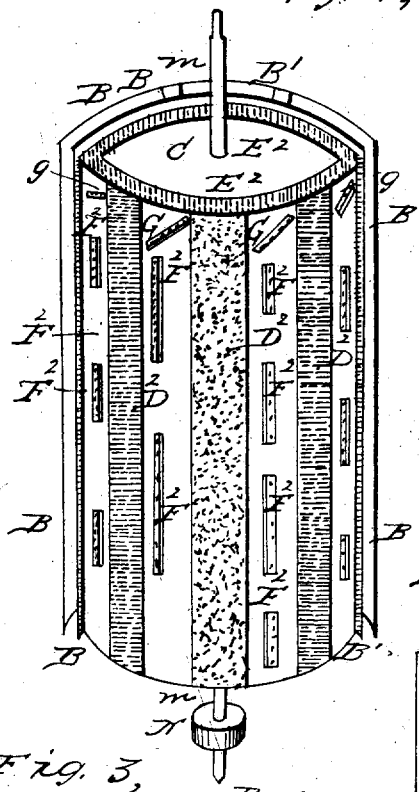
Fig. 5,
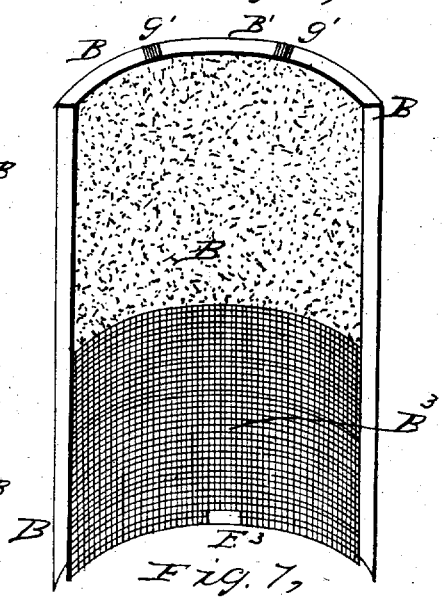
Fig. 7,
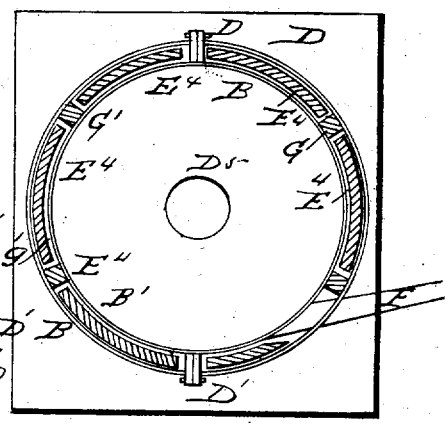
Fig. 3,
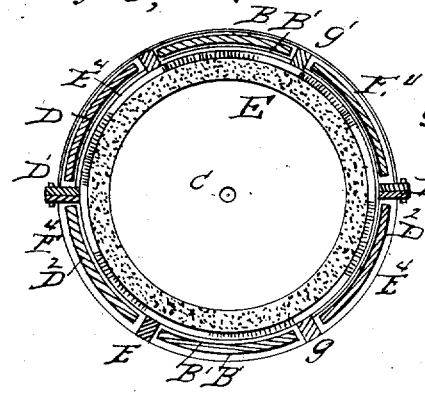
N. PETERS, Photo-Lithographer, Washington, D. C.

FROST & MONROE.
4 Sheets—Sheet 4.
Separating Flour from Bran.
No. 302.
Reissued March 13, 1855.
Fig. 6,
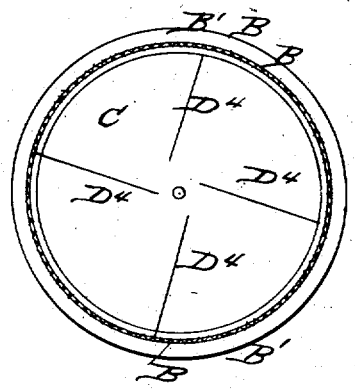
N. PETERS, Photo-Lithographer, Washington, D. C.

UNITED STATES PATENT OFFICE.

ISSACHAR FROST, OF ALBION, MICHIGAN, ASSIGNEE OF J. FROST AND JAMES MONROE.

MACHINERY FOR SEPARATING FLOUR FROM BRAN.

Specification forming part of Letters Patent No. 6,148, dated February 27, 1849; Reissue No. 302, dated March 13, 1855.

*To all whom it may concern:*

Be it known that I, ISSACHAR FROST, of Albion, in the county of Calhoun and State of Michigan, have invented a new and useful Machine for Separating Flour from Bran, Shorts, and Ship-Stuffs; and I do hereby declare that the following is a full, true, and exact description of the construction and operation of the same, reference being had to the annexed drawings, making part of this specification, in which—

Figure 1:
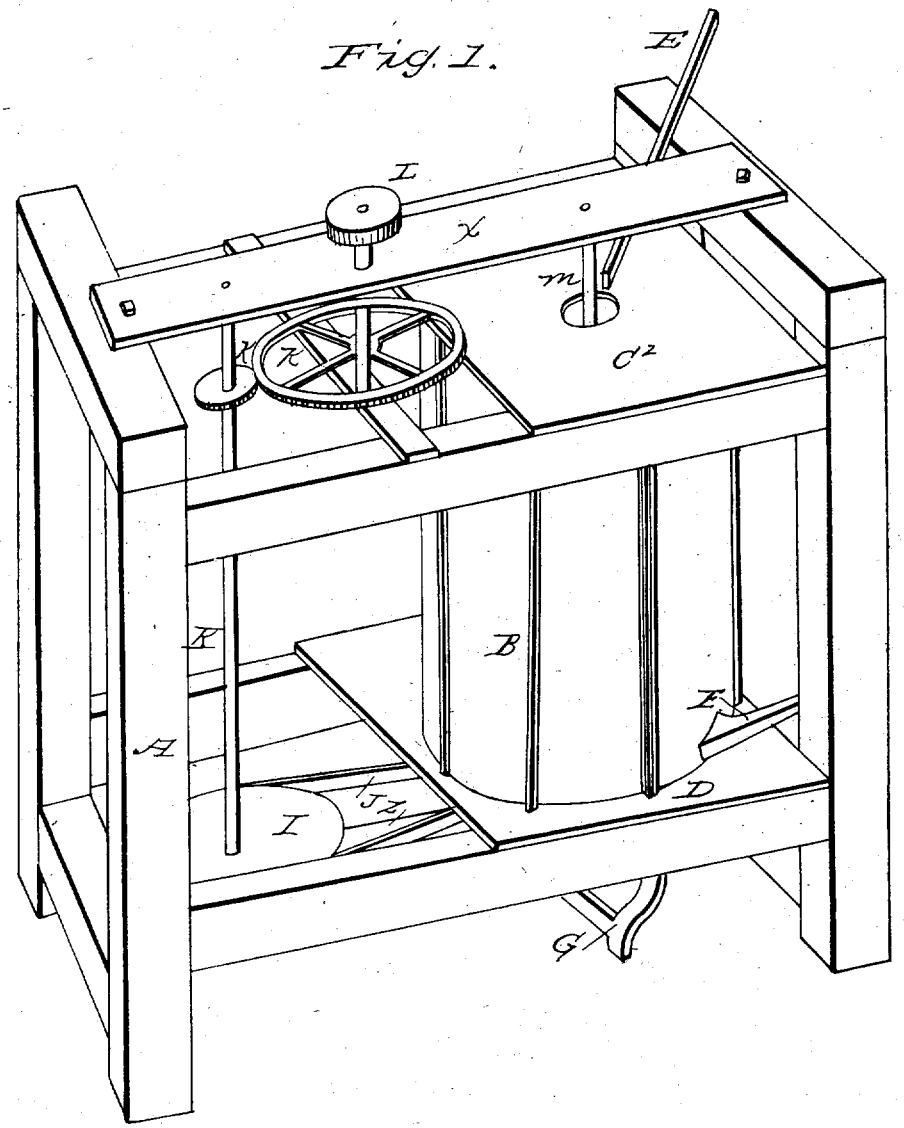
Figure 2:
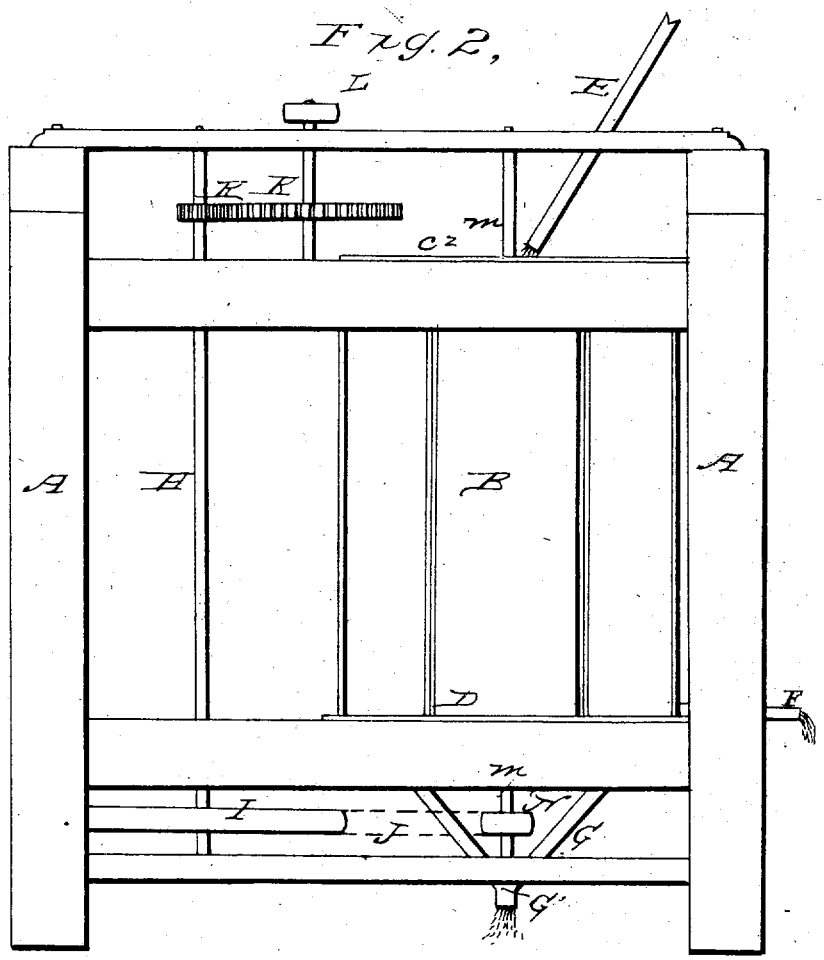

Figure 1 is a perspective view. Fig. 2 is a longitudinal or side elevation. Fig. 3 is a view of the upper end of the cylinder. Fig. 4 is a perspective view of cylinder, showing part and position of the bolt and case. Fig. 5 is a view of bolt and edges of case. Fig. 6 is a view of lower end of cylinder and wings. Fig. 7 is a view of platform and conductor.

In Fig. 1 the full machine is shown in perspective, the frame of which, A A, should be made about two and a half feet wide by four feet long inside, and about four feet, more or less, high, and of timber at least four inches square.

B represents a cylindrical case, made of sheet-iron or other material, supported on the inside by the outside edge of the annular ribs that support the cloth on their inside, made some two to three inches wide, and from half an inch to one inch thick, said case to be twenty-two inches in diameter and thirty-two inches high, inclosed in which (and supported by and attached to the ribs upon the inside of the case) is a cylindrical bolt made of wire bolting-cloth $B^3$ and perforated sheet-iron B′, eighteen inches in diameter and thirty-two inches high; also, inclosed within said case, and within the bolt, is a revolving cylinder, C, sixteen inches in diameter and twenty-nine inches long and attached to and driven by the shaft M.

At $C^2$ is represented the cover or top to the case B, through the center of which is a hole four inches in diameter, rising through which is the shaft M.

At D is shown the platform on which rests the case and bolt, and through the center of which is to be an opening, $D^5$, similar to that in the top $C^2$, through which may pass the shaft M also, for the free admission of air. More fully shown at Fig 7.)

At E is shown a conductor used to convey ground material through the top to the inner portion of the cylinder for bolting or cleaning.

At F is shown a conductor through which is discharged the bran, &c., after cleaning.

At G are shown conductors to convey off the flour, the upper ends of which are connected with the bottom of the bolt or platform, or space E or openings in the bottom or platform D between the bolt and case.

At H, I, J, K, and L, respectively, are shown a shaft, pulley, band, pinion, spur-wheel, and driving-pulley used to drive the cylinder the required velocity, the band J passing from the pulley I and around the pulley N, attached to the lower end of shaft M M, as shown at Fig. 2.

Fig. 2, at A A, represents a side view of the frame B, the case surrounding the bolt-cylinder, &c.; $C^2$, top of case; D, platform or horizontal bottom; E, conductor to feed the machine; F, conductor for bran after cleaning; G G, flour conductor; H, speed-shaft; I, large pulley; J, band; *k k*, pinion and spur-wheel; L, driving-pulley; M M, cylinder-shaft; N, pulley.

Fig. 3 shows the top of the cylinder bolt and case with the top $C^2$, Fig. 1, removed. B shows the edge of case; B′, the edge of bolt; C, the upper end of cylinder; D′ D′, Fig. 7, an extension of ribs upon the outside of the case to admit of bolts to fasten the case (which is made in sections) together.

Fig. 4 shows in perspective the cylinder, made of wood and iron, and parts of the one-half of the case and bolt. B B, the case; B′ B′ B′, the bolt; C, the cylinder. At $D^2$ $D^2$ $D^2$ $D^2$ on the cylinder is represented sections or strips of teeth projecting outward about three-fourths of an inch from the surface. The teeth may be made of brads or small nails with the heads removed and driven in, or may be made by driving large tacks through strips of leather at intervals of one-fourth of an inch, more or less, and nailing the strips of leather on the cylinder with the points of the tacks projecting. The latter mode is the best. The sections of teeth should cover about one-half of the surface of the cylinder.

$E^2$ is a similar strip to those at $D^2$, constructed in the same manner and nailed on the upper end and around the outer edge with the teeth projecting upward, (it may be from two to four inches wide,) which is intended for distributing the material more perfectly and evenly around the bolting-surface; otherwise it would be liable to pass over the upper end of the cylinder in uneven quantities, and, by falling too suddenly, fail to get sufficiently acted upon.

At $F^2$ $F^2$, and upon the cylinder, is shown strips or wings of sheet-iron or other material fastened to the cylinder, with one edge (or both) turned at right angles with the surface of the cylinder, so as to form wings or fans. They may be put at regular or irregular intervals, so as to balance the cylinder, the upper wings, as at *g*, to be put on spirally, so as to cause a downward and spiral motion to the current of air and material between the cylinder and bolt. The wings may project about as far as the ends of the teeth.

At Fig. 5 is shown sections of the bolt and case. B B, edges of the case; B′ B′, the upper part of bolt, made of sheet-iron thickly perforated with small holes by indentation with a sharp-pointed punch, and put on with the rough side next the cylinder, so as the more effectually to scour the bran, &c.; $B^3$, the lower portion of the bolt, made of fine wire bolting-cloth. At $E^3$ is shown an opening leading into the escape-conductor F, Figs. 5, 2, and 7. The bolt may be made in the manner described, or the entire bolt may be made of either substance described above, or any other like substance which will cause the same results.

At Fig. 6 is shown the lower end of cylinder, case, and bolt. B, case; B′, the bolt; C, the cylinder. $D^4$ $D^4$ $D^4$ $D^4$ are wings projecting downward from the ends of the cylinder about one and a half or three-fourth inch in a space of two inches between cylinder and horizontal bottom. The balance of the space is occupied with a cleat on the back edge of bran-spout to arrest the bran brought round by the outer end of the wings immediately to and over the bran-exit, while the many hundred revolutions of the wings around and over the bran-exit operate as a cut-off to prevent the unnecessary discharge of the air through the bran-spout. The arrangement of the wings is such as to induce a large supply of air from $D^5$ to counteract the too rapid fall of the material by the air admitted at the top.

D′, Fig. 7, shows the platform or horizontal bottom always at right angles with the sides of the bolt; *g′ g′*, ribs for dividing the annular space between the case and bolt into spaces or sections; $D^5$, a hole for the free admission of air, and through which the shaft of the cylinder is to pass.

$E^4$ $E^4$ are the segmental spaces or openings in the bottom D′ between the bolt and case. These spaces may be segmental mortises cut through the platform, corresponding in shape and nearly in size with the annular space formed by the ribs of bolt immediately above them, and making part of the same, through which segmental mortises is passed the flour (after being blown through the bolt) into the conductor G, Fig. 1. F, the conductor for the bran, is sometimes made partly through the side of bolt and bottom, sometimes wholly through the bottom.

The above-described machine, when put in the required motion, (about eight hundred revolutions per minute,) will (if constructed as above) scour and separate from bran, shorts, &c., all the remaining particles of flour which may adhere after the first bolting, or may be used as a first bolter by spouting the material direct from the stone into it, which in that case will bolt and fan the flour cool the instant it is ground, preventing the condensation of the atmosphere upon the heated material occasioned by the rapid grinding we do of late years. After the machine is put in motion, the material should be fed in through the conductor E, Fig. 1; there, falling upon the top of the cylinder, is carried by the inward current of air over the end and down the sides between the cylinder and bolt, when it is distributed, beaten, and scoured, so as to remove all remains of flour, the bran continuing in its course (not being permitted to escape through the fine bolting-cloth) downward until it arrives at the horizontal bottom, where it is carried round by the wings or fans to the conductor or bran-spout F, Figs. 7, 2, and 1, while the flour passes through the bolt (with the current of air drawn from top and bottom) into the annular spaces between the bolt and case, thence passes downward into the conductor G, Fig. 1, thence into the flour-chest or the cooler of the mill, when it is again bolted. The perforated portion of the bolt at B may be covered on the convex surface with bolting-cloth to prevent the escape of the flour.

The vertical parallel strips of iron $F^2$ on the cylinder C, may be made rough by punching for scouring the bran.

Having thus fully described the construction, arrangement, and operation of the several parts of my machine, I will now add that I do not mean to claim to be the original inventor of a cylinder, nor of a cylinder covered with punched strips of sheet-iron and strips of leather filled with tacks, such as are used in smut-machines, nor the gearing by which the machine is propelled; but

I do claim—

1. The platform D (always at right angles with the sides of the bolt when not made conical) or close horizontal bottom, when used in connection with upright stationary or revolving bolt for flouring purposes.

2. The opening at $D^5$ for the admission of a counter-current of air through the bottom and into the bolt, and the opening and bran-spout F, as described, in combination with the platform D.

3. The upright stationary bolt, or bolt and scourer combined, with its closed-up top, except for air and material, or in combination with claims 1, 2, and 4, or either of them, or their equivalents, to produce like results in the flouring process.

4. The use in the revolving distributing, scouring, and blowing cylinder of beaters and fans by which the material is distributed, scoured, and the flour blown through the meshes of the bolting-cloth.

ISSACHAR FROST.

In presence of—
S. C. DAVIS,
T. G. CLAYTON.